R. C. BROOKS.
Distilling Spirits.

No. 158,024.

3 Sheets--Sheet 1.

Patented Dec. 22, 1874.

Witnesses
Curtis H Lindley
Frank Otis.

Inventor
Robert Charles Brooks

R. C. BROOKS.
Distilling Spirits.

No. 158,024.

3 Sheets--Sheet 2.

Patented Dec. 22, 1874.

Witnesses
Curtis H Lindley
Frank Otis

Inventor
Robert Charles Brooks

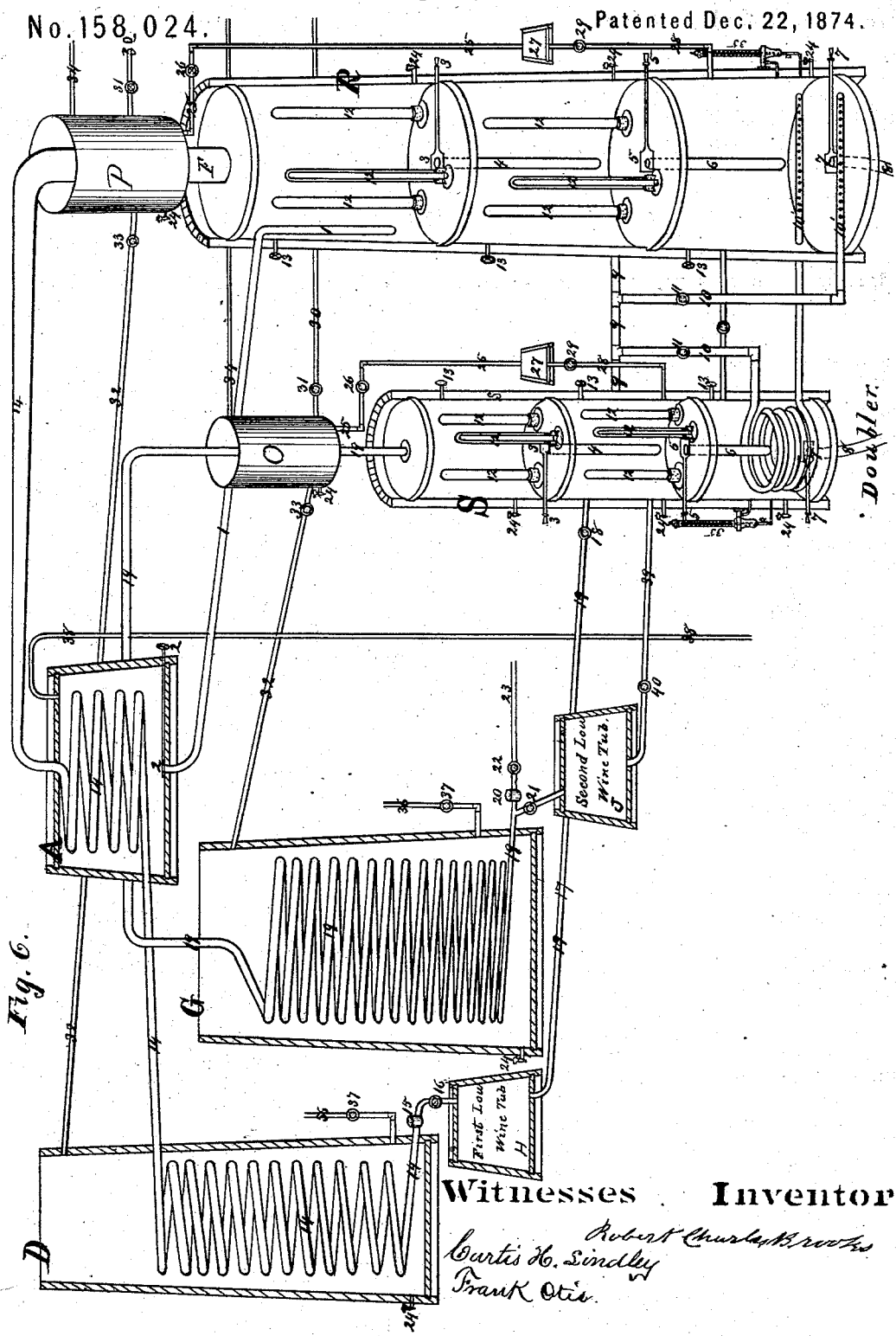

UNITED STATES PATENT OFFICE.

ROBERT C. BROOKS, OF SAN FRANCISCO, CAL., ASSIGNOR OF ONE-HALF HIS RIGHT TO ABRAHAM JACOBUS VAN WINKLE, OF SAME PLACE.

IMPROVEMENT IN DISTILLING SPIRITS.

Specification forming part of Letters Patent No. 158,024, dated December 22, 1874; application filed April 22, 1874.

*To all whom it may concern:*

Be it known that I, ROBERT CHARLES BROOKS, of San Francisco city and county, State of California, have invented an Improved Distilling Apparatus; and I do hereby declare the following description and accompanying drawings are sufficient to enable any person skilled in the art or science to which it most nearly appertains to make and use my said invention or improvement without further invention or experiment.

My invention relates to an improved apparatus for distilling alcoholic spirits, which I call a "Low-Temperature Pulsating Still." This still is especially adapted for accomplishing distillation according to my improved process, which forms in part the subject of this application for Letters Patent.

The arrangement of my improved still is such that the temperature of each part is regulated and prevented from exceeding the limits required to vaporize, condense, and separate each of the products successively in the order in which they are converted into vapor, and I call it a pulsating still because, as each fresh charge of wort is introduced into the heating-chambers of the still, the temperature of the condensing and separating apparatus falls back or recedes by the operation, so that the distillation of each separate charge forms a separate complete operation, beginning at a fixed low temperature, and increasing to the maximum temperature until the distillation is complete.

In order to describe my invention so that others will be able to understand its construction and operation, reference is had to the accompanying drawings, forming a part of this specification, in which—

Figure 2:
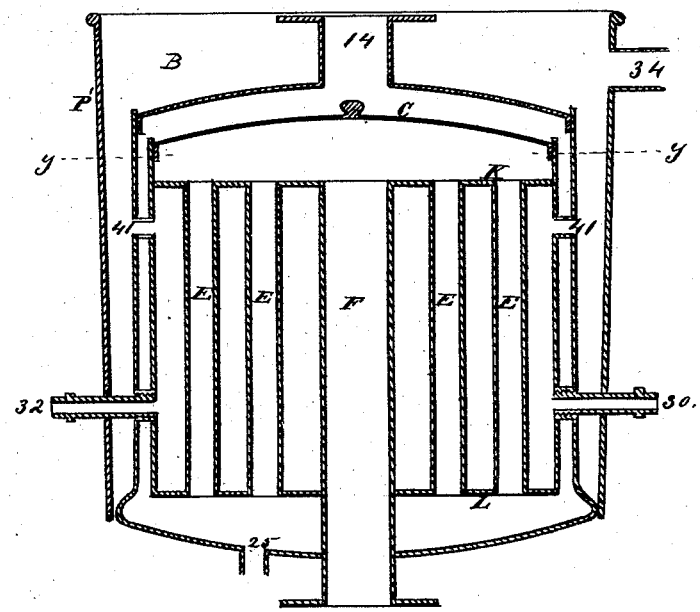
Figure 1:
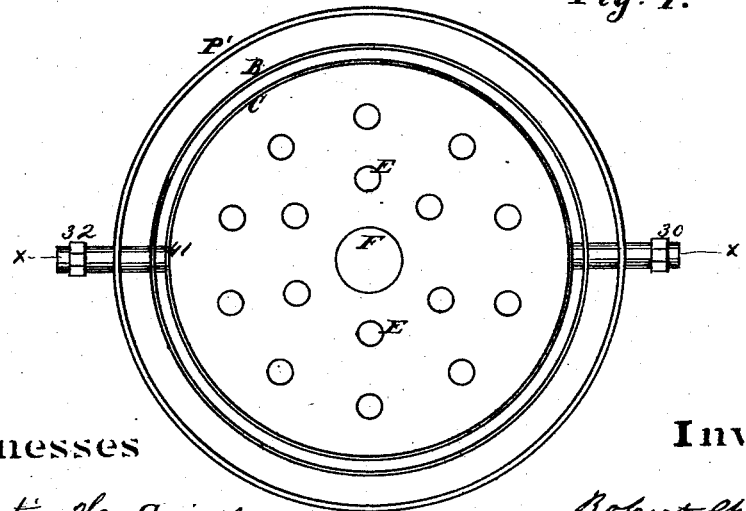
Figure 3:
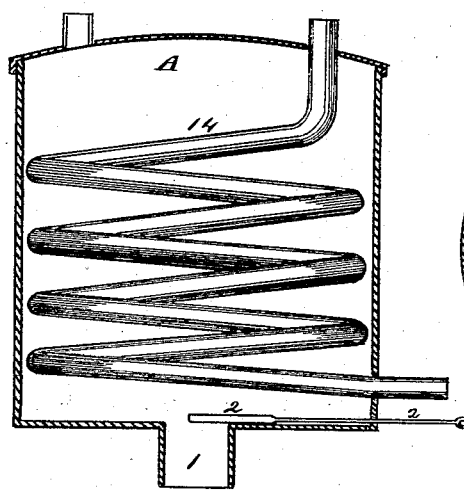
Figure 5:
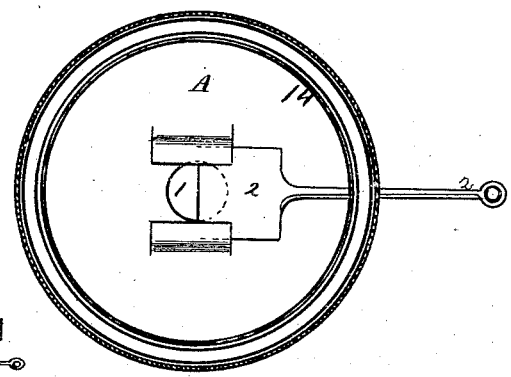
Figure 4:
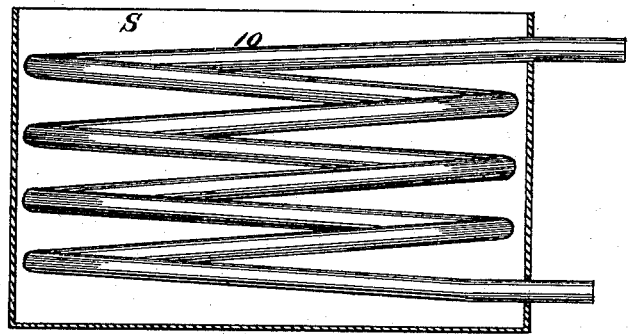

Figure 1 is a top view of my separator. Fig. 2 is a vertical section of the same. Fig. 3 is a sectional view of the vat. Fig. 4 is a section, showing steam-pipe in doubler. Fig. 5 is a bottom view of vat with vapor-coil. Fig. 6 is a sectional view of complete apparatus.

R is the body of a still, which is divided by horizontal partitions into three distinct chambers, in the usual way of constructing a column still, although I do not confine myself to any particular number of chambers. Extending upward from each of the partitions are two or more induction-pipes, marked 12. Each of these induction-pipes consists of an inner tube, which is open at both ends, the lower end of which communicates with the chamber below through the partitions, and an outside covering-tube, which is closed at its upper end, and has a number of perforations or openings at or near its lower end. Thus the steam or vapors from either of the two lower chambers of the still are compelled to pass up through the inner tube, down through the space between the two tubes, and out through the perforations or openings in the outer tube, before it can enter the chambers above.

I have discovered that by thus extending these tubes into the space above the charge of wort in each chamber I provide a drying heat above the wort, which materially aids the process of distillation. This extension of the pipes 12 upward is of greater importance in the upper chamber of the still than either of the others, as it is necessary to pass the vapors through a dry hot space just before passing it into the separator P.

The pipes marked 4 and 6, which depend respectively from the center of each partition into the chamber below, serve to transfer the charge from the upper chambers to the chambers below, valves marked 3 and 5, which can be operated from the outside of the column, controlling the upper open end of each pipe.

Above the column R I locate an open-top vessel, P, which I call a "condenser and separator." This vessel, as shown at Fig. 6, Sheet 3, is connected with the upper chamber of the still by a short cylinder, F, which is of sufficient size to permit the vapors to pass freely from the still without creating a pressure therein.

Inside of the vessel P another vessel, B, is placed, the bottom of which is connected and secured to the bottom of the vessel P. Within the vessel B is placed another vessel, C, which has a top, and the two disks K L inside of it. E E are tubes, (any number of which may be used,) the ends of which pass through the disks K L, and connect the space above K with the space below L.

The cylinder F, which connects this separator with the upper chamber of the still, passes up through the vessel B and opens into the space above the disk K. The large vapor-pipe marked 14 has one end connected with the top of the vessel B, of equal size with the cylinder F, and passes thence to a heating vat or tub, A, which is situated at a short distance from the still, and in this vat the pipe 14 is coiled around, so as to form a coil extending from the top to the bottom of the vat; thence the pipe is led into a water-tank, D, where it is again coiled, as above described, and passes out near the bottom of the tank, so as to discharge into the first low-wine tub H. A pipe, marked 1, connects the bottom of the heating-vat A with the upper chamber of the still, for the purpose hereinafter mentioned; a valve, marked 2, being arranged inside of the vat to close its end when it is not required to be open. The tank D is kept continually filled with water by means of a pump or by water-pressure through pipes. (Not shown.) Near the upper end of this tank is an overflow-pipe, marked 32, which connects with the condensing and separating vessel P above the column, while an overflow-pipe, marked 34, serves to preserve a uniform height of moving water in the condenser and separator P. A pipe, marked 25, the flow through which is regulated by a cock, marked 26, has one end connected with the bottom of the outside separator-vessel P, and thence leads down to a vessel, marked 27, and the bottom of this latter vessel may be connected by a pipe, 28, with the lower chamber of the still, if desired, or with any other vessel; or a simple faucet or draw-pipe may be used, through which the condensed product can be removed entirely from the vessel.

Having thus described the mechanical arrangement of my improved still, I will now describe its operation and manner of working: The three chambers of the still having been properly charged with the wort, I also proceed to fill the vat A with wort, so that it may undergo a preparatory heating previous to its being introduced into the still. Now, the tank D being filled with water, and the condenser and separator P having also been filled through overflow-pipe 32, so as to establish a current of water through these vessels, I introduce steam into the lower chamber of the still at its bottom through the perforated pipe 10'. The steam will soon heat the charge of wort in the lower chamber, and the vapor thus produced will pass up through the stand-pipes 12 into the chamber above. These stand-pipes, as above described, extend above the charge of wort, so that the heated vapor, in passing into the chamber above, will also dry-heat the space above the wort. As the steam or vapor passes upward, it heats the wort in the chambers above until the temperature of the wort in the uppermost chamber reaches 173° Fahrenheit. At this temperature the ether in the wort is converted into vapor and passes up into the condensing and separating vessel P, where it comes in contact with the cool pipes E E, and is condensed so as to fall to the bottom of the vessel, from whence it passes through the pipe 25 to the vessel 27. The ether thus obtained and separated can be allowed to accumulate in the vessel 27 through a number of distillations, and then be withdrawn from the vessel entirely, and either run through the still to remove any trace of alcohol which may have been carried along and condensed with it, or run to waste, as convenient and most profitable. Having got rid of the ether both from the wort and still, I am now free to increase the temperature of the wort in the chambers until it reaches the volatilizing-point of alcohol, which is 188° Fahrenheit. At this temperature the alcohol vaporizes and passes into and through the separator P, which it will readily do, as the previous condensed vapors of ether will have heated the water in the separator-vessel sufficiently to allow the alcoholic fumes to pass through uncondensed. The alcoholic vapors then pass on through pipe 14 into the vat or tub A, and thence through the coil, so as to heat the charge of wort in the vat to a preparatory temperature, thus converting the vat into a fourth chamber of the still. Thence the vapors pass through pipe 14 into the condenser or water-tank D, where they are condensed, and the condensed product conducted into the tub H.

The alcohol being the product which the still is intended to produce, and as I have now obtained the alcohol from the wort without vaporizing the water and fusel-oil which it contains, I shut off the steam from the heating-chambers, and withdraw the spent charge from the lower chamber of the still through the waste-pipe 8. I then open valve 5, so as to allow the charge in the second chamber of the still to pass down into the first chamber. I then close valve 5 and open valve 3. This allows the charge in the third chamber to pass into the chamber below. I then close valve 3 and open valve 2 in the bottom of vat A, so that the charge which has received the preparatory heating may pass through pipe 1 into the upper or third chamber of the still, and a fresh charge of wort is conducted into the vat A, to be heated by the vapor, as previously described.

During the short period of time which is occupied in thus removing the spent charge from the lower chamber and transferring the charges in the upper chambers of the still, the water has been continually running through tank D, thence through pipe 32 into and through the separator P, so that by the time steam is again turned into the still the temperature of the separator and tank will be reduced to about 168° Fahrenheit, and in the proper condition to again condense the vapors of ether which are first volatilized. In this manner the distilling process is continued, the temperature of the condensing apparatus pulsating with each fresh charge of wort, and the charge in the lower chamber of the still being only withdrawn after each run.

For convenience in regulating the temperature, I apply one or more thermometers at convenient parts of the still.

After obtaining the product from the still I usually pass it through what I call a doubler. This doubler is constructed in the same manner as the still, including the separator and condenser. Instead, therefore, of using the doubler, I might pass it again through the still; but this latter would necessitate the discontinuance of the distillation of the wort in the meantime.

By this construction and arrangement I provide a distilling apparatus which is automatic in its operation, and by means of which I am able to separate products of different boiling-points singly, and without intermingling one with the other.

It it is evident, from the foregoing explanation of the construction and operation of my apparatus, that, by means of the cylinder F and large pipe 14, I give a comparatively free vent to the upper chamber of the still, and, consequently, by lessening the pressure in the still, I successfully prevent the heat rising to a degree sufficiently high to vaporize and carry off the fusel-oils. It is also evident that, by the intermittent heating and cooling of the condenser and separator P, known as the pulsating process, I succeed in condensing and separating the ether from the alcohol, and at the same time avoid any condensation of the alcohol in the separator, thus passing the alcohol on to the main condenser entirely free from ether and the fusel-oils.

Having thus described my invention, what I claim, and desire to secure by Letters Patent, is—

1. The still R, provided with two or more chambers, and having the valves 3 and 5, in combination with the condensing and separating vessel P, the connecting-cylinder F, and pipes 14 and 25, substantially as and for the purpose set forth.

2. In combination with the condenser and separator P, the pipe 25, cock 26, tank 27, pipe 28, and cock 29, for the purpose of condensing and separating the ether, substantially as specified.

3. In combination with the still R, constructed as described, the condenser and separator P, vat A, and cooler D, connected by the pipes 1, 32, and 14, whereby a pulsation of temperature is produced, substantially as and for the purpose set forth.

4. The still R, in combination with the condenser and separator P, provided with the connecting-cylinder F, and large pipe 14, whereby the alcoholic vapors are enabled to pass freely from the still to the main condenser without causing a pressure in the still, substantially as and for the purpose set forth.

5. The process herein described of distilling ether and alcohol directly from the wort and free from the fusel-oils, consisting in lessening the pressure in the still during distillation, whereby the temperature is necessarily kept below the point required for the evaporation of the fusel-oils, substantially as herein described.

ROBERT CHARLES BROOKS.

Witnesses:
CURTIS H. LINDLEY,
FRANK OTIS.